United States Patent [19]

Meier et al.

[11] 3,839,593

[45] Oct. 1, 1974

[54] TUBULAR INSULATING CONNECTOR FORMED OF WOUND GLASS WIRES

[75] Inventors: Henri Meier; Henri Warnet, both of Tarbes, France

[73] Assignee: CERAVER, Paris, France

[22] Filed: Sept. 4, 1973

[21] Appl. No.: 394,026

[30] Foreign Application Priority Data
Sept. 4, 1972   France .............................. 72.31257

[52] U.S. Cl. ................ 174/30, 174/140 S, 174/178
[51] Int. Cl.. H01b 17/12, H01b 17/34, H01b 17/42
[58] Field of Search .......... 174/30, 140 S, 176, 177, 174/178, 179, 181, 209, DIG. 4

[56] References Cited
UNITED STATES PATENTS

| | | | |
|---|---|---|---|
| 2,924,643 | 2/1960 | Barnes .............................. | 174/178 |
| 3,159,709 | 12/1964 | Austin et al. ................... | 174/178 X |
| 3,198,878 | 8/1965 | Kaczerginski ..................... | 174/176 |
| 3,261,910 | 7/1966 | Jacquier ............................ | 174/178 |
| 3,468,740 | 9/1969 | Kaczerginski ................... | 174/178 X |

FOREIGN PATENTS OR APPLICATIONS
1,109,151   4/1968   Great Britain ..................... 174/178

*Primary Examiner*—Laramie E. Askin
*Attorney, Agent, or Firm*—Sughrue, Rothwell, Mion, Zinn and Macpeak

[57] ABSTRACT

Electrically insulating connection element comprising two armatures forming shoulders, connected by a junction element comprising wires made of an inorganic substance, more particularly glass, wound on a cylindrical support so as to constitute a cylindrical covering ended by two caps each bearing against the shoulder of an armature, the cylindrical support of the wire covering being radially slightly deformable and constituted preferably by wound wires made of the same inorganic material, with a much shorter pitch than that of the cylindrical covering.

6 Claims, 4 Drawing Figures

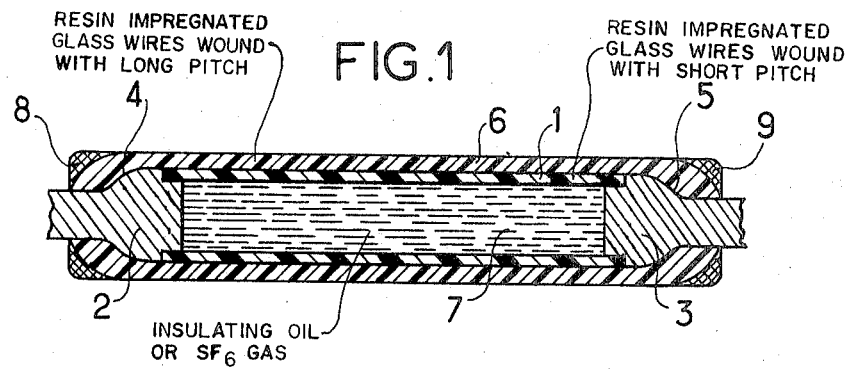
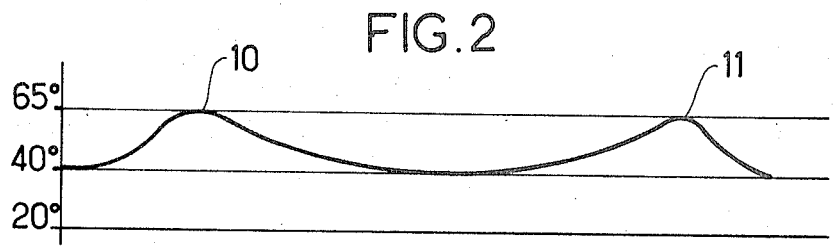
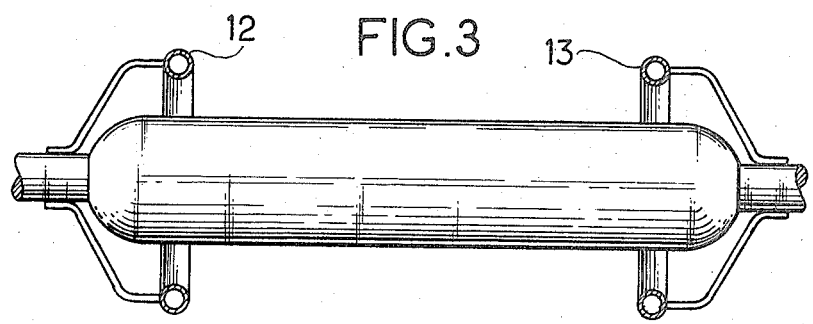
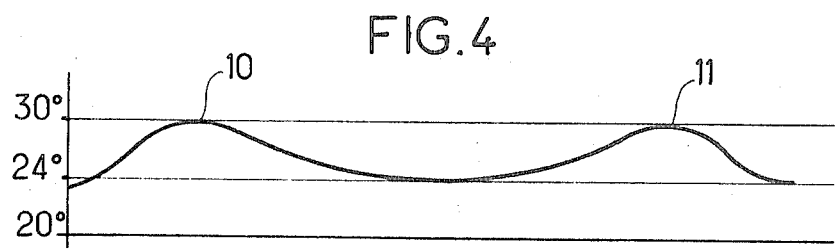

TUBULAR INSULATING CONNECTOR FORMED OF WOUND GLASS WIRES

BACKGROUND OF THE INVENTION

Field of the Invention

The present invention concerns an electrically insulating connection element, comprising two armatures forming shoulders, connected by a link element comprising wires made of an inorganic substance, wound on a cylindrical support so as to constitute a cylindrical covering ended by two caps each bearing on the shoulder of an armature.

Description of the Prior Art

British Pat. No. 1,076,952 in the name of Compagnie Generale d'Electricite describes a method for manufacturing a connection element comprising two metallic armatures connected together by a link element constituted by inorganic wires, more particularly glass wires, preferably impregnated with a resin and wound so as to constitute a cylindrical covering ended by two caps each bearing against a shoulder formed on one of the armatures.

Nevertheless, the applicants have observed that when elements wound according to British Pat. No. 1,076,952 were subjected to great tensile stresses, a constriction deformation of the cylindrical covering occurs, with reducing of the cross-section. That deformation is accompanied by a decohesion of the fibres and subsequently by a reduction of the electrical insulating property.

The present invention aims at overcoming the above disadvantages and providing electrically insulating connection elements capable of resisting great tensile stresses without a substantial modification in their cross-section and having only slight or no decohesion and cracking of the wires in a direction which is close to that of the tractive axis. It also aims at increasing the breaking strength of such elements for a given cross-section and lastly, in the case of elements subjected to high electrical tensions, to reduce the heterogeneities in temperature along the insulating elements so as to slow down their ageing resulting from thermal stresses.

SUMMARY OF THE INVENTION

The connection element according to the invention is characterised in that the cylindrical support of the wire covering is radially only slightly deformable.

It comprises, moreover, preferably at least one of the following characteristics:

In a connection element in which the periphery of the support comprises also wound wires of an inorganic substance, the winding pitch of the wires on the support is much shorter than that of the cylindrical covering.

The cylindrical support is a tube filled with an electrically insulating fluid.

Each of the end caps is surrounded by a collar.

The collars of the caps are each constituted by a winding consisting of a wire made of the same inorganic substances as the caps and having a very small pitch.

In an element for electrically insulating elements under high electrical tension, a metallic voltage distribution ring, arranged in the vicinity of the connection between the cylindrical covering and the cap surrounding the shoulder of the armature is connected to each armature.

A connection element for suspended insulators for electric lines or insulators for electric pylon stays is described hereafter by way of an example and with reference to the accompanying drawings.

BRIEF DESCRIPTION OF THE DRAWINGS

FIG. 1 shows an axial cross-sectional view of a connection element according to the invention.

FIG. 2 is a graph showing the distribution of the temperatures along such a connection element under electrical tension.

FIG. 3 is an axial partial cross-sectional view of a connection element similar to that in FIG. 1, but provided with metallic voltage distribution rings.

FIG. 4 is a graph showing the distribution of the temperatures along the connection element in FIG. 3.

DESCRIPTION OF PREFERRED EMBODIMENTS

The connection element in FIG. 1 comprises a cylindrical tube 1 formed by glass wires wound with a relatively short pitch and impregnated with a hardening synthetic resin, such as a polyester or epoxy resin, connecting together two metallic armatures 2 and 3 forming shoulders 4 and 5.

The inside of the tube 1 is filled by any appropriate means, for example by injection by axial ducts, not shown, of a substance 7 ensuring good connection with the inside wall of the tube, which is only slightly deformable and has good electrical insulating properties.

Glass wire is then wound round the tube and the armatures, taking care that the angle of the wires with the axis of the tube be slight, so that the wires come as close as possible to the longitudinal axis of the tube and in that the winding pitch of the wire be much longer than that of the wound wires forming the tube. According to British Pat. No. 1,076,952 which has already been cited, the wires may rest on the shoulders of the armatures along geodesic lines, the thickness of the winding 6 may be close to the tenth of the diameter of the tube used as a mandrel and the wire may be a wire which is not twisted, consisting of fibres having a diameter of less than 10 microns; the wires are preferably coated with the same hardening synthetic resin as that used for the tube.

Under the action of great tensile stresses, the support tube may undergo shearing without substantial modification of the diameter. This shearing causes decohesion and cracking perpendicular to the axis of traction or at least forming, with that axis, an angle close to 90° and has a much less harmful effect on the electrical voltage property than that resulting from a decohesion of the wires in the cylindrical covering in a direction close to that of the axis of traction, it being possible, moreover to cancel totally the harmful effect of this cracking if, according to the invention, the support tube is filled with an insulating fluid such as an insulating oil or sulphur hexafluoride, SF6, which fills the cracks as soon as they are formed.

It has been observed, moreover, that by providing collaring for the end caps, by windings 8, 9 having a very small pitch (FIG. 1), considerable relief is provided for the extension stresses caused in the caps, by a sort of corner effect of the armature shoulders transferring the tractive loads. These extension stresses are borne by the collars consisting of windings 8, 9 and tests have shown that, everything else being equal, a connection element provided with collars resisted a breaking strain of 145 metric tons per sq. cm whereas the same element without collaring breaks at 120–125 metric tons per sq. cm.

It has also been observed, when connection elements according to the invention are used for producing insulators for stays working under a heavy mechanical load at high tension and high frequency, an uneven distribution of temperature with maximum levels 10, 11 in the vicinity of the connection of the cylindrical covering with the caps occurs (see FIG. 2). It has been observed, for example, for a stay insulator working under 10 metric tons per sq. cm, having a distance of 790 mm between the shoulders, subjected to an electric tension of 100 KV peak at a frequency of 1.6 Kc/s, temperature peaks reach 65° C at the level of the shoulders, 40° C in the central portion, the ambient temperature being 20° C.

The applicants have observed that by arranging two metallic voltage distribution rings 12, 13 connected to the armatures in the vicinity of the connection of the cylindrical covering with the caps, the temperature peaks have been reduced to 30° C and thermal stresses, which were a source of fatigue and ageing, have thus been removed (FIGS. 3, 4).

Although the connection element structure which has just been described is preferable, it will be understood that various modifications may be made thereto without going beyond the scope of the invention, it being possible to replace certain of its elements by others which would fulfill the same technical function. More particularly, the tube 1 made of impregnated glass wire, filled with a packing mass 7, may be replaced by a homogenous mandrel made of a substance having good electrical insulation properties and being only slightly deformable. The various variants provided for in British Pat. No. 1,076,952 may be adopted. More particularly, it is possible to arrange the connection element in an insulation casing which resists the action of an arc, made of a ceramic substance, for example.

We claim:

1. An electrically insulating connection element comprising two metallic armatures having shoulders of substantially hemispherical shape facing away from each other, a link element in the form of a cylindrical support connecting said armatures, a winding of wires made of an inorganic substance wound on said cylindrical support and forming a cylindrical covering thereof, said cylindrical covering terminating at its ends in two caps each bearing against the shoulder of a respective armature, said cylindrical support also comprising at its periphery wound wires of an inorganic substance, with the winding pitch of the wires of the cylindrical support being much shorter than that of the wires of the cylindrical covering.

2. The connection element according to claim 1, wherein: the cylindrical support is a tube filled with electrically insulating fluid.

3. The connection element according to claim 1, wherein: each cap is surrounded by a collar.

4. The connection element according to claim 3, wherein; the collars at each end of the link element are each constituted by a winding of wires made of the same inorganic substance as the caps and having a very small pitch.

5. The connection element according to claim 4, for the electrical insulation of elements under high electrical tension, said element further including a metallic voltage distribution ring connected to each armature, said rings being arranged in front of the places of maximum temperature level of the connection element in the absence of the metallic voltage distribution rings.

6. The connection element according to claim 1, for the electrical insulation of elements under high electrical tension, said element further including a metallic voltage distribution ring connected to each armature, said rings being arranged in front of the places of maximum temperature level of the connection element in the absence of the metallic voltage distribution rings.

* * * * *